United States Patent Office

3,151,983
Patented Oct. 6, 1964

3,151,983
ANIMAL FEED
Charles M. Ely, Berkeley Heights, Anthony P. De Luca, Newark, and Frank Andriuli, Rahway, N.J., assignors to Nopco Chemical Company, Newark, N.J., a corporation of New Jersey
No Drawing. Filed May 9, 1961, Ser. No. 108,766
12 Claims. (Cl. 99—4)

This invention relates to improvements in animal feeds. More particularly, this invention relates to improvements both in the utilization of feed by poultry and in the rate of growth of poultry.

It is known that proteolytic and amylolytic enzymes in combination with one another, when added to poultry feeds, increase the efficiency of utilization of such feeds as evidenced by the greater weight gain of the poultry per unit of feed intake. However, it has been found that the proteolytic and amylolytic enzymes do little to increase the growth response of poultry.

As used herein, the term "growth response" is the result of feeding a feed supplement to poultry over a period of time. Growth response is arrived at by subtracting from the total final weight of all the poultry in a group, the total initial weight of all the poultry in the same group. The difference, divided by the number of birds in the group, is designated growth response. Growth response is indicated in the examples as the average gain of the chicks fed the feed supplement of this invention compared to the average gain of the chicks used in the control.

Feed gain ratio or feed efficiency is arrived at by dividing the total amount of feed consumed by the birds in a particular group by the total gain of the birds in the group.

An object of this invention therefore is to provide a poultry feed which will increase both the growth response and feed efficiency of poultry.

Other objects and advantages will become apparent from the following more complete description and claims.

We have unexpectedly discovered that the above as well as other objects can be accomplished in the following manner.

Broadly, this invention contemplates a process for increasing the growth response and feed efficiency of poultry, by introducing into a poultry feed which is fed to poultry, a feed supplement comprising a mixture of (a) a material prepared by fermenting wet wheat bran under aerobic conditions, using *Aspergillus oryzae* and (b) a materail prepared by fermenting wet wheat bran under aerobic conditions using *Bacillus subtilis*.

This invention also contemplates a feed supplement comprising a mixture of (a) a material aerobically prepared by steaming and wetting wheat bran, inoculating the wheat bran with *Aspergillus oryzae*, maintaining the temperature of the inoculated wet wheat bran at from about 25° C. to about 40° C. and at a relative humidity of at least 95%, while allowing the wet inoculated wheat bran to ferment for from about 40 hours to about 75 hours, rewetting said fermented wheat bran, allowing said rewet fermented wheat bran to incubate for from about 40 to about 60 additional hours under the aforesaid temperature and humidity to bring about further fermentation, and finally air drying said wet fermented wheat bran at temperatures below about 55° C. and (b) a second material aerobically prepared by steaming and wetting wheat bran, inoculating said wet wheat bran with *Bacillus subtilis*, exposing the wet inoculated wheat bran to air, and allowing said wet inoculated wheat bran to incubate for from about 30 hours to about 60 hours at a temperature of from about 25° C. to about 45° C. and a relative humidity of at least 95%, and air drying the fermented wheat bran at below about 55° C.

As used herein, the term Material A encompasses the material prepared using *Aspergillus oryzae*, and the term Material B encompasses the material prepared using *Bacillus subtilis*.

We have unexpectedly discovered that when both Material A and Material B are mixed into a poultry feed and fed to poultry, both the growth response and feed efficiency of the poultry are greater than when either Material A or Material B alone, are added to a poultry feed and fed to poultry. While it is probable that the increase in feed efficiency is due to the presence of amylolytic and proteolytic enzymes, the increase in the growth response of the poultry is not explained by any known enzymatic activity and is attributed to an unknown growth factor.

When up to 95% of the amylolytic and proteolytic enzymes are removed from Material A by washing with from about five pounds of water to about twenty pounds of water for each pound of Material A, the resultant washed material, when added to a poultry feed and fed to poultry, is ineffective in obtaining a favorable growth response or feed efficiency from the poultry. On the other hand, when up to 95% of the amylolytic and proteolytic enzymes are removed from Material B by washing with about five pounds of water to about twenty pounds of water for each pound of Material B, the resultant material, when added to a poultry feed and fed to poultry, does not result in a proportionate decrease in the growth response of poultry when compared with unextracted Material B. Rather, we have found that the growth response of poultry remains at a high level when poultry is fed the enzyme extracted material.

We have also found that the growth response of poultry is greater when the enzyme extracted Material B alone is fed to poultry, as compared to an unextracted commercially available product wherein amylolytic and proteolytic enzymes are present.

Generally speaking, our feed supplement is prepared by mixing the two fermented materials designated as Material A and Material B.

Material A can be prepared in the following manner. Wheat bran is added to a large horizontal cooker having a tight fitted cover. The wheat bran is steamed under a pressure of from about 0.5 to 1.0 p.s.i.g. so that complete pasteurization is effected and partial sterilization takes place. The steam is then released from the cooker and the bran is allowed to cool to about 55° C. at which point, tap water is sprayed onto the bran for cooling and wetting purposes. The wheat bran is then inoculated with a spore slurry containing *Aspergillus oryzae*. During these operations, aseptic techniqeus are used. The inoculated wet bran mixture is then placed on trays. These trays are placed in sterilized incubator rooms where the temperature and relative humidity are carefully controlled. The temperature of the bran mixture on the trays is maintained at from about 25° C. to about 40° C. by circulating filtered air through the incubator rooms. The relative humidity of the rooms is maintained at at least 95% by bleeding low pressure steam into the room. The fermentation is allowed to proceed for from about 40 to 75 hours under the above controlled conditions. The wet, partially fermented wheat bran is then removed from the trays, again placed in the horizontal cooker and water sprayed on the partially fermentated bran to rewet same. Rewetting results in further fermentation of the wet inoculated wheat bran.

The inoculated rewet bran is allowed to ferment for about 40 to about 60 additional hours under the same controlled temperature and humidity as aforedescribed. Finally, warm dry air, at a temperature of from about 30° C. to about 55° C., is circulated through the incubator rooms until the fermented bran is dry.

In preparing Material A, while the temperature of the incubator room may vary, if it is below 25° C. then the process would not be economical as the time required for complete fermentation before rewetting would be unduly lengthly. We have found that by rewetting the bran in preparing Material A, we are able to induce additional fermentation on the wheat bran. If the temperature is above 40° C. then while the fungus will grow, it will not produce the enzymes and growth factor. However, we prefer temperatures of from 32° C. to 35° C. because we have found that these temperatures produce a more active product.

While the length of time Material A is allowed to ferment may vary from about 40 to about 75 hours, if Material A is allowed to ferment for less than about 40 hours fermentation will be incomplete and a less active product would be obtained. If the time of fermentation exceeds about 75 hours, then the enzymes and growth factor will be destroyed. We prefer however, to utilize a fermentation time of from about 48 to about 72 hours as optimum results have been obtained at this preferred range.

Material B is prepared in the following manner. Wheat bran is added to a horizontal cooker with a tight fitting cover and then steamed under a pressure of from 0.5 to 1.0 pound per square inch gauge. The steam is then released and the bran is cooled to about 55° C. at which time water is sprayed onto the bran for cooling and wetting purposes. The wheat bran is then inoculated with Bacillus subtilis. During all these operations, aseptic techniques are used in order to avoid contamination. The inoculated bran is then placed in sterilized trays in a sterilized room under controlled temperature and relative humidity. The temperature of the bran is maintained at from about 25° C. to 45° C. by circulating filtered air through the incubator rooms. The relative humidity of the room is maintained at at least 95% by bleeding low pressure steam into the room. The bacterial fermentation is conducted for from about 30 to about 60 hours under the above controlled conditions. Air, at a temperature of from about 30° C. to about 55° C., is then circulated through the room until the wheat bran ferment is air dry.

While the temperature of the incubator room may vary, if it is below 25° C., then the process would not be economical as complete fermentation would take too long. If the temperature is above 45° C., then, while the bacteria will grow, it will not produce the enzymes and growth factor. We prefer however to utilize temperatures of from about 33° C. to about 36° C. as we have found that when employing these temperatures, an excellent economically produced product is obtained.

The length of time that Material B is allowed to ferment can vary from about 30 to about 60 hours. If Material B is allowed to ferment for less than about 30 hours, then fermentation would be incomplete and a less active product would be obtained. On the other hand, if Material B is allowed to ferment for more than about 60 hours, then the enzymes and growth factor would be destroyed. We prefer however, to utilize, for Material B, a fermentation time varying from about 48 to about 60 hours as we have obtained excellent results thereby.

During fermentation of Material A and Material B, considerable heat is developed. This is dissipated by circulating air through the fermentation room. As the fermentation decreases in activity, less heat is developed, and less air is circulated. When there is no longer need for air, fermentation is considered complete.

In the discussion which follows, unless indicated otherwise, the remarks apply to the preparation of both Material A and Material B. All equipment is presterilized before use to prevent possible contamination of the bran.

Before the wheat bran is wet, it should be inspected to determine if the wheat bran particles are too fine. If, as occasionally happens, the wheat bran particles are too fine, then when the bran is inoculated with the fungus or bacteria and placed in the incubator room, the bran particles will be so closely packed as to deprive the aerobic fungus or aerobic bacteria of the air needed to grow and produce the enzymes and growth factors. However, a wheat bran of fine particle size can be used if oat hulls are added to the bran. The oat hulls serve the function of keeping the fine bran particles apart, thus allowing air to be present between the bran particles with the result that the aerobic fungus or aerobic bacteria will now have the air needed for proper growth and production or the growth factors and enzymes.

The manner of wetting the bran is not critical and may be accomplished in any suitable manner so long as there is present from about 40% to about 65% of water based on the total weight of the water plus the wheat bran.

If less than about 40% of water is present, then the bacteria or fungus will not grow sufficiently and will thus not produce as much enzymes and growth factors as would be possible if the bran were wet properly. If more than about 65% of water is present, then the aerobic fungus and bacteria will be deprived of the air needed to grow and produce the enzymes and growth factors, and a much poorer product would be obtained.

By initially steaming the bran, we not only partially wet the bran, but we also gelatinize the starch in the bran so that the microorganisms which the bran is inoculated with are able to grow better. Steaming of the bran also accomplishes the destruction of foreign organisms which are initially present in the bran. Steaming of the bran therefore is a desirable step in order to assure a purer and more active product.

We prefer to wet the bran by first steaming it in a horizontal cooker for about an hour under a pressure of from 0.5 to 1.0 p.s.i.g. By initially wetting the bran in this manner, we also effect a complete pasteurization and a partial sterilization. After the steam is released and the bran allowed to cool to about 55° C. or any other convenient temperature, tap water is sprayed on the bran for wetting and additional cooling purposes. However, as mentioned previously, the bran need not be wet in this manner, and any other suitable wetting method may be used.

When the wheat bran is inoculated and placed in the incubator rooms, the relative humidity is maintained at at least 95% while the bacteria or fungus grows. If the relative humidity is allowed to fall below 95%, then there is a good possibility that the bran will dry out and the growth of the fungus or bacteria will be prematurely terminated. The relative humidity may be maintained in any suitable manner. We maintain the relative humidity at a minimum of 95% by bleeding low pressure steam into the incubator room.

During the fermentation process, considerable heat is developed. This heat is dissipated by circulating filtered air through the incubator rooms. It will be recalled that during fermentation in the incubator rooms, temperature of fermentation is critical as aforedescribed. However, the heat developed during fermentation may be dissipated in any suitable manner.

In the preparation of Material A, after fermentation is apparently complete as evidenced by the absence of further generated heat, we have found that we are able to induce further fermentation by rewetting the bran through the addition of more water thereto. However, it should again be noted that the amount of water present with the bran should be between about 40% and about 65% based on the total weight of bran and water. After rewetting the bran, the bran is again placed in the incubator room and temperature and relative humidity are maintained as before. After the rewetting, the bran is allowed to ferment for from about an additional 40 hours to about an additional 60 hours. If it is allowed to ferment for more than about an additional 60 hours, then the enzymes and growth factor will be destroyed to a great extent or completely. An additional fermentation time of less than about 40 hours will result in a less active product than could be obtained.

After fermentation of all materials is complete, as evidenced by the absence of generated heat, the fermented bran is dried at a temperature of from about 30° C. to about 55° C. by circulating warm air through the incubator room. While any temperature not exceeding 55° C. can be used to dry the fermented bran, if the drying temperature is below about 30° C., it would take too long for the bran to dry. If a temperature in excess of 55° C. is used, then the growth factors and enzymes would be rendered ineffective as regards poultry.

In discussing the preparation of Material A and Material B, enzymes are produced as well as growth factors. If desired, the enzymes may be removed from Material B by washing Material B with water. This can be done since seemingly the growth factor present in Material B is not too water soluble. For example, we have water extracted as much as 95% of the enzymes from Material B and have still obtained a high growth response when the material which was not water extractable was fed to poultry. In comparison, when Material A is washed with water and then fed to poultry, a negligible growth response is obtained.

The factor which is responsible for the growth response obtained when non-water washed Material A is fed to poultry is not known. Nevertheless, the fact remains that when non-water washed Material A and non-water washed Material B are combined and fed to poultry, a growth response is obtained which is greater than the growth response obtainable with either one alone.

We prefer not to remove the enzymes from Material B as the enzymes are also of value in feeding poultry.

The amounts, by weight, of Material A and Material B in admixture with each other can vary widely, e.g., from about 25% of Material A and about 75% of Material B to about 75% of Material A and 25% of Material B. While these amounts may be more widely varied, we have obtained optimum results at these ranges.

The amount of Material A and Material B added to the feed, either alone or in combination can vary from 1.25 pounds per ton of feed to 16 pounds per ton of feed. However, it should be noted that as much of Material A or/and Material B may be added to the feed as is desired.

In order to more fully illustrate the nature of this invention and the manner of practicing the same the following examples are presented.

The general procedure employed in the examples was as follows: All tests were conducted on one day old White Vantress cockerels. The test groups varied from 14 to 30 chicks and were divided into three equal lots of chicks. All experiments reported were of 38 to 43 days duration. During this time, the chicks were housed in electrically heated starting batteries and supplied with food and water ad libidum. The temperature of the starting batteries was maintained from about 80° F. to about 85° F. A special effort was made to minimize the effect of cage position upon the biological response by placing different lots of the same group in different cage positions. All chicks and feed were weighed at the beginning of the experiment and all pertinent data was recorded at weekly intervals. The individual rations for the chicks were prepared at the beginning of the experiment from a freshly mixed large batch of non-supplemented Basal ration mixed in a vertical Brower Whirlwind type mixer, using a mixing cycle of 20 minutes. Where used, Material A and/or Material B was added to the Basal ration and the supplemental Basal ration was again mixed as aforedescribed.

The composition of the non-supplemented Basal Ration used is as follows:

| Ingredients: | Percent by weight |
|---|---|
| Ground western barley | 50.00 |
| 44% soybean meal | 30.00 |
| Tallow | 4.00 |
| Meat and bone scraps | 4.00 |
| Fish meal | 3.00 |
| Alfalfa meal | 2.00 |
| Dried whey | 2.00 |
| Distillers solubles | 2.00 |
| Bone meal | 1.25 |
| Limestone | 1.00 |
| Salt | 0.25 |
| Vitamin and mineral supplements [1] | 0.50 |
| | 100.00 |

[1] The vitamin supplements and trace minerals supplied per pound of ration consisted of:

| | |
|---|---|
| Vitamin A, USP units | 2,000 |
| Vitamin $D_3$, I.C. units | 500 |
| Vitamin E, I.U. | 0.5 |
| Riboflavin mg | 1.5 |
| Niacin mg | 12.5 |
| d-Pantothenic acid mg | 2.5 |
| Choline chloride mg | 125 |
| Vitamin $B_{12}$ activity micrograms | 3 |
| dl-Methionine gm | .1135 |
| Butylated hydroxy toluene gm | .0567 |
| Manganese mg | 27.2 |
| Zinc mg | 12.5 |
| Iodine mg | .54 |
| Copper mg | .91 |
| Cobalt mg | .09 |
| Iron mg | 9.07 |
| Procaine penicillin mg | 1.50 |
| Arsanilic acid mg | 45.0 |

The following tables summarize the data obtained according to the general procedure.

*Effect of Feeding Basal Rations Supplemented With Material A, Material B and Mixtures Thereof, on the Growth Response and Feed Efficiency of Poultry*

| | Group | No. Chicks | Amount of A and/or B Added (Lbs./Ton of Feed) | Average Gain/Bird (Grams) | Improvement in Gain Compared to Control (Percent) | Feed-Gain Ratio | Improvement in Feed-Gain Compared to Control (Percent) |
|---|---|---|---|---|---|---|---|
| Example I 28 Day Test | Control | 30 | | 383.8 | | 2.255 | |
| | Material A plus Material B | 30 | 2 2 | 430.6 | 12.2 | 2.073 | 8.1 |
| Example II 38 Day Test | Control | 16 | | 658.0 | | 2.257 | |
| | Material B | 16 | 8 | 733.2 | 11.4 | 2.206 | 2.5 |
| | Material A | 15 | 8 | 736.9 | 12.0 | 2.165 | 4.1 |
| | Material A plus Material B | 14 | 4 4 | 803.0 | 22.0 | 2.105 | 6.7 |

|  | Group | No. Chicks | Amount of A and/or B Added (Lbs./Ton of Feed) | Average Gain/Bird (Grams) | Improvement in Gain Compared to Control (Percent) | Feed-Gain Ratio | Improvement in Feed-Gain Compared to Control (Percent) |
|---|---|---|---|---|---|---|---|
| Example III 38 Day Test | Control | 16 | | 620.4 | | 2.322 | |
| | Material B | 16 | 8 | 686.0 | 10.6 | 2.302 | 0.86 |
| | Material A | 16 | 8 | 698.6 | 12.6 | 2.215 | 4.6 |
| | Material A plus Material B | 14 | 4 / 4 | 731.7 | 17.9 | 2.174 | 6.4 |
| Example IV 43 Day Test | Control | 16 | | 663.4 | | 2.181 | |
| | Material B | 18 | 5 | 686.4 | 3.5 | 2.008 | 7.9 |
| | Material A | 18 | 5 | 646.9 | 2.5 | 2.086 | 4.4 |
| | Material B plus Material A | 17 | 3.75 / 1.25 | 713.7 | 7.6 | 2.103 | 3.6 |
| | Material B plus Material A | 17 | 1.25 / 3.75 | 682.5 | 2.9 | 2.074 | 4.9 |
| | Material A plus Material B | 18 | 2.5 / 2.5 | 718.2 | 8.3 | 2.019 | 7.4 |
| Example V 42 Day Test | Control | 16 | | 652.9 | | 2.330 | |
| | Material A plus Material B | 16 | 2 / 2 | 688.7 | 5.5 | 2.171 | 6.8 |
| | Material A plus Material B | 16 | 4 / 4 | 670.7 | 2.7 | 2.197 | 5.7 |
| | Material A plus Material B | 16 | 8 / 8 | 711.0 | 8.9 | 2,195 | 6.0 |
| Example VI 36 Day Test | Control | 20 | | 1,446.4 | | 2.662 | |
| | Material A plus Material B | 30 | 2 / 2 | 1,558.6 | 7.8 | 2,517 | 5.4 |

The above examples demonstrate that either Material A or Material B alone, when added to a basal ration and fed to poultry, improve the growth response and feed efficiency of poultry. This conclusion is apparent from an inspection of the columns respectively entitled "Improvement in Gain Compared to Control (percent)" and "Improvement in Feed-Gain Compared to Control (percent)." Moreover, the aforequoted columns show that when Material A and Material B are combined and the combination added to a basal ration and fed to poultry, a growth response and feed efficiency are obtained which is greater than the growth response and feed efficiency obtained by feeding to poultry, a basal ration supplemented with either Material A alone or Material B alone.

In order to demonstrate that the enzymes present in our feed supplement are not responsible for the unexpected growth response when fed to poultry, separate portions of Material A and separate portions of Material B were individually washed with approximately 16.5 lbs. of water for each pound of Material A, and 16.5 lbs. of water for each pound of Material B, thereby extracting substantially all of the enzymes. As the examples below illustrate, when substantially all of the enzymes were extracted from Material B, the growth response remained high especially when compared to the amount of enzymes remaining therein. However, the growth response obtained using washed Material A was negligible.

Moreover, when substantially all of the enzymes were removed from Material A and substantially all of the enzymes were removed from Material B, and basal rations were supplemented with one or the other of these materials and fed to poultry, a feed efficiency was obtained which was poorer than the feed efficiency obtained with the control. This negative feed efficiency is explained by the removal of substantially all of the amylolytic and proteolytic enzymes from the feed supplement.

*Effect of Feeding Basal Rations Supplemented With Washed or Unwashed Material A or B—or Unwashed Mixtures of Material A Plus Material B, on the Growth Response and Feed Efficiency of Poultry.*

|  | Group | No. Chicks | Amount of A and/or B Added (Lbs./Ton of Feed) | Average Gain/Bird (Grams) | Improvement in Gain Compared to Control (Percent) | Feed-Gain Ratio | Improvement in Feed-Gain Compared to Control (Percent) |
|---|---|---|---|---|---|---|---|
| Example VII 28 Day Test | Control | 27 | | 366.0 | | 2.090 | |
| | Material A | 27 | 4 | 367.1 | 0.3 | 2.038 | 2.5 |
| | Material B | 27 | 4 | 391.6 | 7.0 | 2.061 | 1.4 |
| | Material A plus Material B | 26 | 4 / 4 | 397.0 | 8.5 | 2.041 | 2.3 |
| | Washed Material A | 26 | 4 | 368.0 | 0.5 | 2.183 | −4.4 |
| | Washed Material B | 24 | 4 | 384.7 | 5.1 | 2.121 | −1.5 |

As has been shown, our feed supplement when prepared in the manner described, not only improves the feed gain ratio when fed to poultry, but also improves the growth response of the poultry. Also, as has been shown, when Material B is combined with Material A, and the combination fed to poultry, a growth response by the poultry is obtained which is greater than the growth response obtained by feeding either Material A or Material B alone.

We prefer not to extract the enzymes from Material B as these are also of value in a poultry feed supplement. However, if extraction is desired, it may be done by washing Material B with water.

Moreover, application of this feed supplement need not be limited to poultry but is also applicable to cattle, and other livestock.

While this invention has been described in terms of certain preferred embodiments and illustrated by means of specific examples, these are illustrative only, and the invention is not to be construed as limited, except as set forth in the following claims.

Having described our invention, what we claim as new and desire to secure by Letters Patent is:

1. A process for obtaining enhanced growth response and feed efficiency of animals, comprising introducing into a feed which is fed to animals, a feed supplement which is a synergistic combination of growth factors comprising a mixture of (a) a material prepared by fermenting wet wheat bran under aerobic conditions, using *Aspergillus oryzae* and (b) a second material prepared by fermenting wet wheat bran under aerobic conditions using *Bacillus subtilis*, in amounts which promote synergistic feed and growth response of animals.

2. A process according to claim 1, wherein there is present from 25% of said material (a) and 75% of said second material (b) to 75% of said material (a) and 25% of said second material (b), based upon the total weight of both materials (a) and (b).

3. A process for increasing the growth response and feed efficiency of poultry comprising introducing into a poultry feed which is fed to poultry, a feed supplement which is a synergistic combination of growth factors comprising a mixture of (a) a material prepared fermenting wet wheat bran under aerobic conditions using *Aspergillus oryzae*, and (b) a second material prepared by fermenting wet wheat bran under aerobic conditions using *Bacillus subtilis* and extracting substantially all of the amylolytic and proteolytic enzymes by washing said second material with water, said (a) and (b) being present in said mixture in amounts which promote synergistic feed and growth response in poultry.

4. A feed supplement for increasing the growth response and feed efficiency of animals and which is a synergistic combination of growth factors comprising a mixture of (a) a material aerobically prepared by steaming and wetting wheat bran, inoculating the wheat bran with *Aspergillus oryzae*, exposing the wet inoculated wheat bran to air, maintaining the temperature of the inoculated wet wheat bran at from about 25° C. to about 40° C., and a relative humidity of at least 95% while said wet inoculated wheat bran ferments for from about 40 hours to about 75 hours, rewetting said fermented wheat bran, allowing said rewet fermented wheat bran to incubate in the presence of air for about 40 to about 60 additional hours under said temperature and humidity to bring about further fermentation, and finally air drying said wet fermented wheat bran at temperatures below about 55° C. and (b) a second material aerobically prepared by steaming and wetting wheat bran, inoculating said wet wheat bran with *Bacillus subtilis*, exposing the wet inoculated wheat bran to air, and allowing said wet inoculated wheat bran to incubate for from about 30 hours to about 60 hours at a temperature of from 25° C. to about 45° and a relative humidity of at least 95% and air drying said wet inoculated wheat bran at below about 55° C., said (a) and (b) being present in said mixture in amounts which promote synergistic feed and growth response in animals.

5. The feed supplement of claim 4, in which there is present from about 25% to about 75% by weight of Material (a) and about 75% to about 25% by weight Material (b).

6. A process for increasing the growth response and feed efficiency of poultry comprising supplying the poultry with a diet containing a feed supplement which is a synergistic combination of growth factors comprising a mixture of (a) a material prepared by fermenting wet wheat bran under aerobic conditions using *Aspergillus oryzae* and (b) a second material prepared by fermenting wet wheat bran under aerobic conditions using *Bacillus subtilis*, said (a) and (b) being present in said mixture in amounts which promote synergistic feed and growth response in poultry.

7. The process of claim 6 in which there is present from about 25% to about 75% by weight of material (a) and from about 75% to about 25% by weight of material (b).

8. The process of claim 6 in which there is present about 50% by weight of material (a) and about 50% by weight of material (b).

9. A process according to claim 1 in which there is present about 50% by weight of material (a) and about 50% by weight of material (b).

10. A feed supplement for increasing the growth response and feed efficiency of animals which is a synergistic combination of growth factors comprising a mixture of (a) a material prepared by fermenting wet wheat bran under aerobic conditions, using *Aspergillus oryzae* and (b) a second material prepared by fermenting wet wheat bran under aerobic conditions using *Bacillus subtilis*, said (a) and (b) being present in said mixture is amounts which promote synergistic feed and growth response in animals.

11. The composition of claim 10 in which there is present from about 25% to about 75% by weight of material (a) and from about 75% to about 25% by weight of material (b).

12. The composition of claim 10 in which there is present about 50% by weight of material (a) and about 50% by weight of material (b).

References Cited in the file of this patent
UNITED STATES PATENTS

| | | |
|---|---|---|
| 2,451,567 | Le Mense et al. | Oct. 19, 1948 |
| 2,738,274 | Le Mense et al. | Mar. 13, 1956 |
| 2,906,621 | Catron | Sept. 29, 1959 |
| 2,906,622 | Lewis | Sept. 29, 1959 |
| 2,988,448 | Hollenbeck | June 13, 1961 |